No. 730,349. PATENTED JUNE 9, 1903.
A. R. DODGE.
PACKING.
APPLICATION FILED AUG. 21, 1902.
NO MODEL.
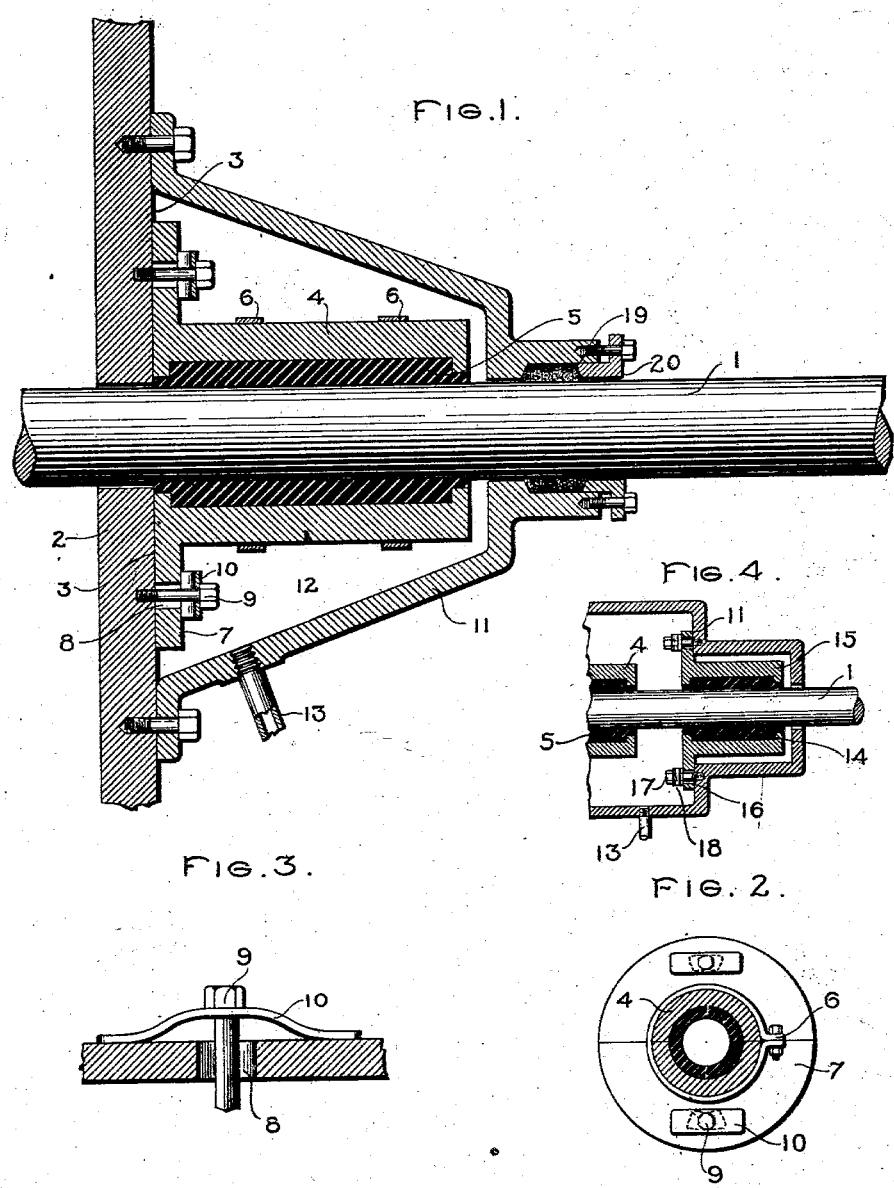
WITNESSES:
Harry A. Tilden.
Helen Orford
INVENTOR:
Austin R. Dodge.
by Albert S. Davis
Atty.

No. 730,349. Patented June 9, 1903.

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

PACKING.

SPECIFICATION forming part of Letters Patent No. 730,349, dated June 9, 1903.

Application filed August 21, 1902. Serial No. 120,485. (No model.)

*To all whom it may concern:*

Be it known that I, AUSTIN R. DODGE, a citizen of the United States, residing at Schenectady, county of Schenectady, State of New York, have invented certain new and useful Improvements in Packings, of which the following is a specification.

Great difficulty has heretofore been experienced in making packings which are suitable for maintaining tight joints between moving and stationary parts where elastic fluid is employed. This is particularly true of so-called "vacuum-joints." Hemp is commonly employed for such purposes; but this is unsatisfactory, for it degenerates with use— that is to say, the tallow or other compound with which it is mixed melts out and it loses weight. When the hemp is packed tight enough to temporarily maintain a working joint, it creates an excessive amount of friction and is burned to a greater or less extent. It also has to be lubricated, and this is objectionable where it is used for maintaining a vacuum in a vacuum-chamber, because the lubricant will work along the moving shaft and enter the chamber and there mingle with the steam. In order to make use of the water due to condensation of the steam, it is necessary to prevent the lubricant from being entrained therewith. When the packing is relatively loose, air will enter the vacuum-chamber and impair the vacuum. When steam passes through the joint, the efficiency of the apparatus is reduced. Efforts have also been made to use metallic packings, but without any permanent success, chiefly owing to the lubrication required, to the excessive friction, and to the difficulty of making good joints between parts of the packings.

The difficulties mentioned in connection with hemp and metallic packings are always present to a greater or less degree; but where the packings are used in connection with relatively large shafts—say from four to six inches—and revolving at from twelve hundred to fourteen hundred revolutions per minute they become a source of the greatest annoyance. The greater the peripheral speed, other things being equal, the greater is the objection to their use. With a low vacuum the difficulties are not so pronounced, of course, but these increase as the vacuum becomes higher and reaches a point that is considered commercial for steam-turbines. Where large and expensive shafts are employed, the dangers due to metallic packings are greatly increased, for if the supply of lubricant fails for any reason the shaft may be cut to such extent that it is necessary to remove it from the engine and turn it up in a lathe.

I have discovered that a highly-efficient packing, particularly adapted for vacuum-joints, can be made out of carbon similar in nature to that used for brushes on dynamo-electric machines. The carbon packing preferably takes the form of a sleeve, which may be made in a single piece or split, as the exigencies of the case demand. The sleeve should make a snug fit with the moving shaft—from .002 to .003 of an inch clearance will be found to be satisfactory. The sleeve can be rigidly attached to some stationary part of the machine, in which case the clearance may with advantage be made between limits which are slightly greater than those mentioned. I have found it advantageous, however, to cause the sleeve to float on the shaft instead of holding it fixedly in place, in which case it can make a very snug fit with the shaft, and the effects of pounding due to vibrations and irregularities of the shaft will be reduced to a minimum. When the sleeve or packing is arranged to float with the shaft, means are provided for interposing a resistance to the passage of air or other gas around the packing-holder to the vacuum-chamber. In one embodiment of my invention springs are employed to hold the packing holder or support in frictional engagement with the wall of the vacuum-chamber or other part to be protected. In another embodiment a small steam-pressure is employed which may or may not be used in connection with the springs; but in both instances the floating feature is retained. No matter how hot the carbon packing gets it will not roughen the shaft, and by reason of the closeness of fit between the moving and stationary parts the desired vacuum-joint can be maintained.

In the accompanying drawings one embodiment of my invention is shown; but it is to be understood that the apparatus employed can be varied without departing from my invention.

Figure 1 is a longitudinal section of a packing and its holder. Fig. 2 is an end view of the packing-holder with the shaft removed. Fig. 3 is a detail view showing one of the springs for holding the support against the wall or casing of the vacuum-chamber, and Fig. 4 is a longitudinal section of a double form of packing.

In the drawings, 1 represents the main shaft of a turbine or other motor, which extends into or through the vacuum-chamber or other receptacle designed to be protected either from air or steam, as the case may be. The wall is apertured to receive the driving-shaft 1, and sufficient clearance is provided to prevent the parts from binding. The outer face 3 of the wall is finished to receive the flanged end of the packing holder or support. The packing-holder may be of any suitable construction. The one shown comprises a tubular portion 4, which surrounds the carbon packing-sleeve 5. While it is true that the form of the holder can be varied, it is important that some holder, preferably of metal, be employed; otherwise the continual vibration to which the carbon is subjected would cause it to rapidly disintegrate. Where a suitable metallic holder is employed, the effect of the pounding, due to any longitudinal movement of the shaft and also due to any lateral vibration is taken up by the holder and the carbon suffers no injury. The length of carbon-surface exposed to the shaft 1 can be varied to suit the conditions of service. The ends of the holder are provided with shoulders which engage with corresponding shoulders on the sleeve and prevent it from moving endwise. The holder can be made in any desired form, the one shown being made in two pieces and secured by bands or clamps 6. On the end of the support adjacent to the wall of the vacuum-chamber is a flange 7, having slots 8, through which the bolts or retaining-pins extend. The meeting surfaces of the flange and wall should be finished so as to permit the parts to make close contact. The surface should also present considerable area, so as to minimize any tendency to leak at this point. Between the heads of the bolts and the flange on the support are flat springs 10, which exert sufficient pressure to maintain the holder in position against the wall, yet do not cause undue binding of the parts. The slots 8 are large enough to permit of any necessary movement of the packing-sleeve and its support due to irregularities of the shaft.

From the foregoing it will be seen that the holder is free to adjust itself to the positions of the shaft. In other words, it floats to a limited extent, but is held against rotation by the bolts 9.

Instead of providing the carbon sleeve with a holder the sleeve itself may be flanged so as to engage with the wall 2, in which case it should be provided with a finished face and slotted to receive the retaining bolts or pins; but I do not consider this to be the most improved form. Equivalent means could be employed to hold the sleeve in place. Owing to the cost of the carbon sleeve, it will be found desirable, however, to make it small and use a metal holder.

After use the carbon sleeve will be found to have a highly glazed or polished surface where it engages with the shaft or other moving parts. No lubricant is necessary with this arrangement. Hence no difficulty will be experienced due to oil in the vacuum-chamber. With turbine-shafts there is considerable vibration due to their relatively high speeds. Hence with ordinary fixed metal packings considerable clearance has to be provided; but where carbon is used and it is so supported that it can float with the shaft it can be arranged to make a very close fit with the shaft and will not be affected by the shaft vibrations. Carbon further possesses the advantage of being capable of floating on a shaft without lubrication, and this without cutting or otherwise injuring it.

Surrounding the packing is a detachable casing 11, which is bolted to the wall 2 and preferably makes a steam-tight joint therewith. The outer end of the casing is provided with a receptacle arranged to receive a packing 19 of suitable material, which may be lubricated or not, as is found necessary. This packing is compressed by the gland 20. The packing is only intended to be serviceable for low pressures. Hence it does not have to be very tight, and the wear is practically negligible.

In addition to serving as a support for the carbon packing the flange on the holder and also the end thereof act as a piston or surface against which a fluid under pressure can act.

Steam or other fluid under a very small pressure is admitted to the chamber 12 by the pipe 13. Under ordinary conditions one to three pounds pressure is great enough to cause the packing-sleeve holder to hug the wall 2, at the same time permitting it to adjust itself to conform to the position of the shaft. The packing being intended for vacuum-chambers, there is of course a tendency to suck it against the wall 2, and this permits the use of a very low pressure in the chamber 12. In certain instances it may be found unnecessary to use the pressure-chamber 12, reliance being placed on the springs 10.

In Fig. 4 is shown a double carbon packing, one being intended to prevent the entrance of air or steam to the vacuum-chamber, the other to prevent the escape of low-pressure steam to the atmosphere. 1 represents the driving-shaft, 4 the holder, and 5 the main carbon packing-sleeve within the holder. The character of the sleeve and holder is the same as previously described. Instead of the soft packing 19 at the outer end a carbon sleeve 14 is provided, which is supported by a flanged holder 15. The latter is slotted at 16 to receive the bolts 17. Between the heads of the bolts and the flange are flat springs 18, which hold the flange against a shoulder formed on the casing 11. The arrangement forms a floating support for the sleeve and the action is the same as previously described. Steam or other fluid under pressure is admitted to the chamber 12, in which the packings are located by the pipe 13.

Where the shaft is long, it will be found desirable to split the carbon sleeve, as shown in Fig. 2, so as to permit of renewals, and preferably the line of division is arranged to break joint with that of the holder. This feature applies both to the inner and outer bearing.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In combination, a shaft, a wall or stationary support, a carbon packing which closely surrounds the shaft and is supported thereby, a holder for the packing, and means for permanently maintaining the holder in frictional contact with the wall.

2. In combination, a shaft, a stationary support, a floating packing which closely surrounds the shaft and comprises a body of carbon, a metallic holder for and floating with the carbon, and devices engaging with the metal holder which prevent the holder and packing from rotating but permit them to adjust themselves circumferentially to compensate for irregularities in the shaft.

3. In combination, a shaft, a stationary support, a carbon sleeve which surrounds the shaft and is supported thereby, an inclosure for the sleeve, and a conduit for carrying fluid under pressure to the inclosure for holding the sleeve in place.

4. In combination, a shaft, a wall, a carbon sleeve which closely surrounds the shaft and is supported thereby, springs for holding the sleeve against longitudinal movement, and pins which prevent the sleeve from turning.

5. In combination, a shaft, a wall, a carbon packing-sleeve which floats on the shaft, a metal holder for the sleeve, a means for preventing rotary movement of the holder, an inclosure for the sleeve and holder, and a conduit for admitting fluid under pressure to the inclosure for holding the support against the wall.

6. In combination, a shaft, a wall, a floating carbon packing-sleeve, and a two-part holder therefor, the line of division of the sleeve being arranged to break joint with that of the holder.

7. In combination, a shaft, a wall, a pair of oppositely-disposed, carbon packing-sleeves which closely surround the shaft and are supported thereby, an inclosure for the sleeves, and a conduit for admitting fluid under pressure to the inclosure in such manner that the sleeves tend to move away from each other.

In witness whereof I have hereunto set my hand this 6th day of August, 1902.

AUSTIN R. DODGE.

Witnesses:
BENJAMIN B. HULL,
JOS. A. L. ENDRES.